(12) United States Patent
Tilgner et al.

(10) Patent No.: US 8,244,307 B1
(45) Date of Patent: Aug. 14, 2012

(54) SYSTEM ALLOWING HANDS FREE USE OF A MOBILE PHONE IN CONJUNCTION WITH A VEHICLE TRANSCEIVER

(75) Inventors: Rainer Tilgner, Rossdorf (DE); Frank Dietrich, Linden (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 09/568,675

(22) Filed: May 11, 2000

(30) Foreign Application Priority Data

May 11, 2009 (DE) .................................. 199 21 533

(51) Int. Cl.
*H44M 1/00* (2006.01)
*H04B 1/034* (2006.01)
(52) U.S. Cl. ........ 455/569.1; 455/95; 455/96; 455/596.2
(58) Field of Classification Search .................... 455/41, 455/350, 349, 344, 345, 569, 550, 552, 66, 455/11.1, 431, 569.1, 569.2, 91–96; 379/56.3
See application file for complete search history.

(56) References Cited

U.S. PATENT DOCUMENTS

| | | | |
|---|---|---|---|
| 5,797,088 A | 8/1998 | Stamegna | |
| 5,867,794 A | 2/1999 | Hayes et al. | |
| 5,898,392 A | 4/1999 | Bambini et al. | |
| 6,069,588 A * | 5/2000 | O'Neill, Jr. | 343/713 |
| 6,088,589 A * | 7/2000 | Valentine et al. | 455/433 |
| 6,154,658 A * | 11/2000 | Caci | 455/466 |
| 6,163,711 A * | 12/2000 | Juntunen et al. | 455/557 |
| 6,282,491 B1 | 8/2001 | Bochmann et al. | |
| 6,397,086 B1 * | 5/2002 | Chen | 455/569 |
| 6,532,374 B1 * | 3/2003 | Chennakeshu et al. | 455/569.1 |
| 6,542,758 B1 * | 4/2003 | Chennakeshu et al. | 455/569.2 |
| 6,650,345 B1 * | 11/2003 | Saito et al. | 715/764 |
| 6,792,295 B1 * | 9/2004 | Hanevich et al. | 455/569.1 |
| 7,257,426 B1 * | 8/2007 | Witkowski et al. | 455/569.2 |

(Continued)

FOREIGN PATENT DOCUMENTS

DE 4244468 7/1994

(Continued)

OTHER PUBLICATIONS

Article entitled "Bluetooth—The universal radio interface for ad hoc, wireless connectivity," by Jaap Haartsen, from Ericsson Review No. 3 1998.

(Continued)

*Primary Examiner* — Wayne Cai
*Assistant Examiner* — Huy C Ho
(74) *Attorney, Agent, or Firm* — Cozen O'Connor

(57) ABSTRACT

A communications system for a motor vehicle in which the hands-free device for a mobile phone is integrated into an audio or information system of the motor vehicle such as a car radio. The voice and/or data transmission between the mobile phone and the hands-free device takes place over an additional short-range radio link. A transceiver for this short-range radio link is contained both in the car radio and in the mobile phone. The need to install additional connection interfaces is thus eliminated. In addition, the need to couple the mobile phone to the hands-free device using a cable is eliminated. This has the advantage that the mobile phone can remain, for example, in the driver's pocket. The coupling between the mobile phone and car radio occurs automatically if the mobile phone moves into the range of the short-range radio link of the car radio.

36 Claims, 4 Drawing Sheets

U.S. PATENT DOCUMENTS

| | | | |
|---|---|---|---|
| 7,349,722 B2 * | 3/2008 | Witkowski et al. | 455/569.2 |
| 7,787,907 B2 * | 8/2010 | Zeinstra et al. | 455/563 |
| 2008/0300779 A1 * | 12/2008 | Uhlmann et al. | 701/200 |

FOREIGN PATENT DOCUMENTS

| | | | |
|---|---|---|---|
| DE | 29614668 | | 11/1996 |
| GB | 2264613 A | * | 9/1993 |
| JP | 7143051 | | 6/1995 |
| JP | 7288869 | | 10/1995 |
| JP | 10336311 | | 12/1998 |
| WO | WO 96/32783 | * | 10/1996 |
| WO | WO 98/15075 | | 4/1998 |
| WO | WO 98/17502 | | 4/1998 |
| WO | WO 99/30429 | | 6/1999 |

OTHER PUBLICATIONS

INCISOR News from the Bluetooth and short range of rf environment: Dec. 1998; Click I.T. Ltd,: Stapeley Down Farm, Oldham, Hampshire, England.

INCISOR News from the Bluetooth and short range of rf environment: May 1999; Click I.T. Ltd,: Stapeley Down Farm, Oldham, Hampshire, England, 9 pages.

"Bluetooth: Vision, Goals, and Architecture," Jaap Haartsen et al., Mobile Computing and Communications Review, vol. 2, No. 4, pp. 38-45.

* cited by examiner

SYSTEM ALLOWING HANDS FREE USE OF A MOBILE PHONE IN CONJUNCTION WITH A VEHICLE TRANSCEIVER

BACKGROUND OF THE INVENTION

1. Field of the Invention

The present invention relates generally to a communications system of a motor vehicle having a mobile phone with a first transceiver device for communicating on a first radio link between the mobile phone and a stationary transceiver system of a mobile radio system. The communication system preferably includes an audio and/or information system that is installed in the motor vehicle and has a receiver and an audio output unit and a microphone for implementation of a hands-free function. Voice and/or data transmission takes place between the mobile phone and the audio and/or information system over a wireless link. It is possible to output voice calls which are received at the mobile phone via the audio output unit.

2. Description of the Related Art

In order to operate mobile phones in motor vehicles safely when driving, hands-free devices are used which permit the driver to make a telephone call without having to hold the mobile phone. Such a hands-free device contains at least one microphone for picking up the voice of the driver or of another vehicle occupant and a loudspeaker for outputting the voice of the calling party. Appropriate hands-free devices can be mounted as stand-alone units in a vehicle and are connected to the mobile phone by means of an interface.

Because most motor vehicles have an audio system, as a rule a radio unit, solutions are known which also make use of the radio unit's loudspeakers for the hands-free device. In this case, a connection must be made between the radio unit and the mobile phone, and it is thus necessary to provide a mount for the mobile phone in the vehicle. The implementation of such a hands-free device is work-intensive, in particular when it is retrofitted in the motor vehicle, and requires cables to be laid.

WO 96/32783 discloses a hands-free device with which the installation effort can be reduced. For this purpose, an interface is provided which is connected to the mobile phone. The interface contains a transmitter unit for wireless transmission of the incoming voice signals of a telephone call to a radio unit in the vehicle. The signals that are transmitted by the interface are picked up by the radio unit's antenna and converted into audio signals in the radio receiver. These audio signals are fed to the loudspeakers via an amplifier. The transmission between the interface and the radio unit is carried out at any desired radio frequency in the AM or FM range. During an incoming call, the driver can thus listen to the incoming voice signals via the loudspeaker of the radio unit after he has selected the correct reception channel. The microphone is located in the interface mount. In this way, a hands-free device is implemented using a conventional radio unit which reduces the cabling complexity.

Nevertheless, in this hands-free device as well, the basic installation of the mount with the interface initially must be carried out in the motor vehicle. In addition, in each case the mobile phone has to be connected to the interface, with the result that every time the mobile phone is used in the motor vehicle certain handling steps are required.

SUMMARY OF THE INVENTION

One object of the present invention is to provide a communications system which includes an audio and/or information system, in particular a radio unit, and a mobile phone, with a hands-free function in such a way that no additional installation effort in the motor vehicle is necessary and even on each occasion when the mobile phone is used in the motor vehicle for the first time at the beginning of a journey, no additional handling steps, such as for example connecting the mobile phone to an interface, are required.

A further object of the invention consists in providing a radio unit which is adapted to the requirements of such a communications system according to the invention. A further object consists in specifying a method for convenient operation of a hands-free device of a motor vehicle. Other objects and advantages of the present invention will be apparent from this Summary and the following Detailed Description.

These objects are achieved in a communications system of the generic type in a motor vehicle by a second transceiver that is integrated into the mobile phone, and the audio and/or information system contains not only the receiver but also a transmitter for setting up a second radio link as a bidirectional short-range radio link between the second transceiver of the mobile phone and the audio or information system.

In the communications system according to the invention, both incoming and outgoing voice and/or data signals are transmitted between the mobile phone and the audio or information system over a radio link. This ensures that no additional mechanical installation effort is required for the hands-free device. In contrast, the hands-free device is integrated completely into the car or information system. The need to connect the mobile phone to an interface or the like before each journey is also eliminated completely. With the communications system according to the invention, the mobile phone can therefore remain, for example, in the driver's pocket or any other convenient location within the automobile.

The radio link between the mobile phone and the audio and/or information system is a short-range radio link, with the result that the transmission preferably also takes place on different frequencies or with different transmission methods than the transmission on the first radio link between the mobile phone and a stationary transceiver system of the mobile radio system.

The information system can be, in particular, a navigation or telematic system with voice input and output which is present in the vehicle. Because radio receivers are, however, used in motor vehicles today to an even greater extent, it is, in particular, preferred to use a radio unit as audio system in the described communications system. The radio unit then contains not only its conventional receiver unit for receiving radio signals but also a transceiver unit for transmitting signals between the radio unit and the mobile phone. The transmission between the mobile phone and the radio unit takes place here on frequencies outside the frequency bands of the radio signals.

The radio unit contains all the electronic components that are essential for the hands-free device. These are, in particular, components for automatically switching over to the hands-free function or else an electronic system for preventing feedback between the voice output via the loudspeakers and the voice input via the microphone. The microphone can, in particular, also be provided in the radio unit itself. However, so that it is not necessary to pay attention to the placing of the microphone in the vicinity of a speaker in the motor vehicle when the radio unit is being positioned in the vehicle, the radio unit has a microphone input, and the microphone is arranged at a different location in the motor vehicle. Suitable installation locations for the microphone in the motor vehicle are, in particular, the inside roof lining of the vehicle, the A pillar, the dashboard or the center console, the sun visor or the interior mirror. In order to obtain a good signal-to-noise ratio it is also possible to embody the microphone, in particular, as a directional microphone. The external microphone can be connected to the radio unit via a cable connection, but, in particular, a wireless link is also advantageous here. The latter may, in particular, be an infrared or radio connection.

The radio transmission between the radio unit and the mobile phone takes place preferably at frequencies of more than 2 GHz. The transmission then lies above the usual frequencies for radio links between the mobile phone and a stationary transceiver system of a mobile radio system and also above the frequency bands for radio signals. The transmission power of the transmitter device for the connection within the vehicle between the mobile phone and radio unit can be kept very low.

A range for the short-range radio link of approximately 10 m is considered adequate. In this context, a radio link using the Bluetooth method is particularly significant. The Bluetooth method has been developed in conjunction between various companies as a short-range communications method with ranges of typically 10 m. Ranges up to approximately 100 m are possible options. The transmission power of 1 mW is very low. The 2.4 GHz frequency band is preferably provided for transmission. The method can be used to implement data rates up to one megabit/sec. The low current demand of only 0.3 mA in the standby mode is of particular interest. As a result, a Bluetooth receiver in the radio unit can continuously be kept in the standby mode. Even if the vehicle is not used for a relatively long time, no significant loading of the battery arises.

As a result of the fact that the standby mode is also permanently possible in the motor vehicle, the driver does not need to perform any particular steps to activate the hands-free device when he enters the motor vehicle with his mobile phone. Instead, with the method which is described later, the hands-free device is activated automatically. A control element with which the driver can accept a call that is received at the mobile phone is provided on the radio unit. This corresponds to the known procedure when a telephone call is received at the mobile phone itself. With the communications system according to the invention, the driver does not need to carry out any further steps.

In one particular embodiment there is provision for the mobile phone to be capable of being operated by means of control elements of the radio unit. This means, in other words, that when the driver wishes to make a call he can dial the number of the other party by operating the control elements on the radio unit. In this case also, it is not necessary for the driver to pick up the mobile phone or for the mobile phone to be located directly within his reach.

However, in one particular preferred embodiment, the bidirectional transmission of data and voice calls between the mobile phone and the radio unit also makes it possible for the mobile phone to be used, for example, by other vehicle occupants as a remote control for the radio unit or for other devices connected to the radio unit in the vehicle.

In one alternate preferred embodiment of the communications system there is provision for the radio unit to be connected to, or equipped with, a voice recognition system, in order to process voice commands. As a result, when the driver wishes to make a call he can use voice commands to inform the communications system of the party he wishes to contact. For example, to do this, the driver merely speaks the name of the desired other party. The telephone number which is associated with the aforesaid name is then stored in the communications system, and in particular in the radio unit of the communications system or else in the mobile phone. When the word spoken is recognized by the voice recognition system, the associated telephone number is then automatically dialed and the voice connection is set up. The voice recognition system can also be integrated in the mobile phone itself.

Although mention has been made hitherto, and will also be made below, essentially of a radio unit, the communications system can, as an audio and/or information system, also include other devices. In addition to the navigation or telematic system already mentioned, said equipment may be in this context, for example, also a CD player and the like. In particular, the radio unit can and will as a rule also interact with other audio systems and/or said audio systems can and will be integrated into the radio unit.

Navigation systems are used to inform the driver of a suitable route to his destination. Navigation systems are known as so-called onboard or also as offboard navigation systems. In the case of onboard navigation systems, the calculation and display of a route is carried out completely with components present in the vehicle. In offboard navigation systems, data is transmitted, for example, from the route network from an external station into the motor vehicle. This will be carried out, in particular, by means of the mobile phone. However, in all cases it is desirable for the navigation systems also to include current traffic reports in the routine calculation. The system is then referred to as a dynamic navigation system. The traffic reports can then be transmitted on broadcast radio channels (for example RDS-TMC) or on a mobile radio network.

In another exemplary embodiment, the communications system according to the invention is therefore connected to a navigation system or contains such a system. In order to implement a dynamic navigation system, the radio unit is configured to pass on to the navigation system traffic, driving or route information that is received either from a radio station or via the mobile phone.

In order to filter the incoming traffic information, it is also advantageous if the mobile phone contains a position-determining means, for example a GPS receiver or a system for evaluating the position by means of the mobile radio network (cellular positioning). This also simultaneously facilitates the emission of an emergency call, because the precise position of the vehicle can be communicated together with the emergency call.

As has already been mentioned, the mobile phone can also be used as a remote control by virtue of the transmission of data to the radio unit. However, it is possible not only to set functions of the radio unit by remote control but also to control other vehicle functions if the respective device is connected to the radio unit via a suitable bus.

A motor vehicle radio unit according to the invention for use in the communications system described above has an input unit, a receiver for receiving radio signals within specific frequency bands and means for converting the received radio signals into audio signals by means of an audio output unit. The invention provides for a further receiver unit and a transmitter unit which is connected to the further receiver unit to be additionally integrated into the radio unit. The further receiver unit and the transmitter unit are configured to connect an external device in wireless fashion over a bidirectional short-range radio link.

Voice signals which are received by means of the further receiver unit are output by means of the audio output unit, and the transmission using the short-range radio link takes place outside the frequency bands of the radio signals. As a result of the transceiver device, integrated into the radio unit, for a bidirectional short-range radio link, the radio unit can connect to a multiplicity of units which have an appropriate device. In addition to the mobile phone already mentioned above, the external unit may be, in particular, a personal computer. If the radio unit is connected, for example, to a navigation system, or contains the navigation system, the driver can work out his route at home on the personal computer. The information does not then need to be transferred manually from the personal computer to the navigation system or to be transferred over a cable which has to be specially installed. Instead, the transmission can take place in wireless fashion over the short-range radio link to the radio unit, and from there to the navigation system.

The external unit may also be, in particular, a headset. The headset is connected directly to the radio unit over the short-range radio link. In this way, individual vehicle passengers can, for example, listen to a music channel over the headset. The headset can, in particular, also contain control elements, for example for setting specific functions of the radio unit or the volume. The transmission between the radio unit and the headset takes place over the wireless short-range radio link in the same way as described above in conjunction with the mobile phone. Further examples of external devices are external display and control components, an audio or video device or else a door opener, such as, for example the garage door.

In the latter case, the driver can then transmit a signal to the garage door over the short-range radio link by activating an appropriate key on the radio unit. The garage door contains a corresponding receiver and a motor for closing and opening the door.

In one exemplary embodiment, the method has the following method steps:
1. Mutual identification of a radio unit and a mobile phone when the mobile phone enters the radio coverage area of the radio unit;
2. Switching of the hands-free device into the standby mode; and
3. Activation of the hands-free device for the transmission of incoming or outgoing mobile radio data between the mobile phone and the radio unit;

BRIEF DESCRIPTION OF THE DRAWINGS

The invention is explained in more detail below with reference to exemplary embodiments and the drawing, in which.

DETAILED DESCRIPTION OF THE PREFERRED EMBODIMENTS

Figure 1:
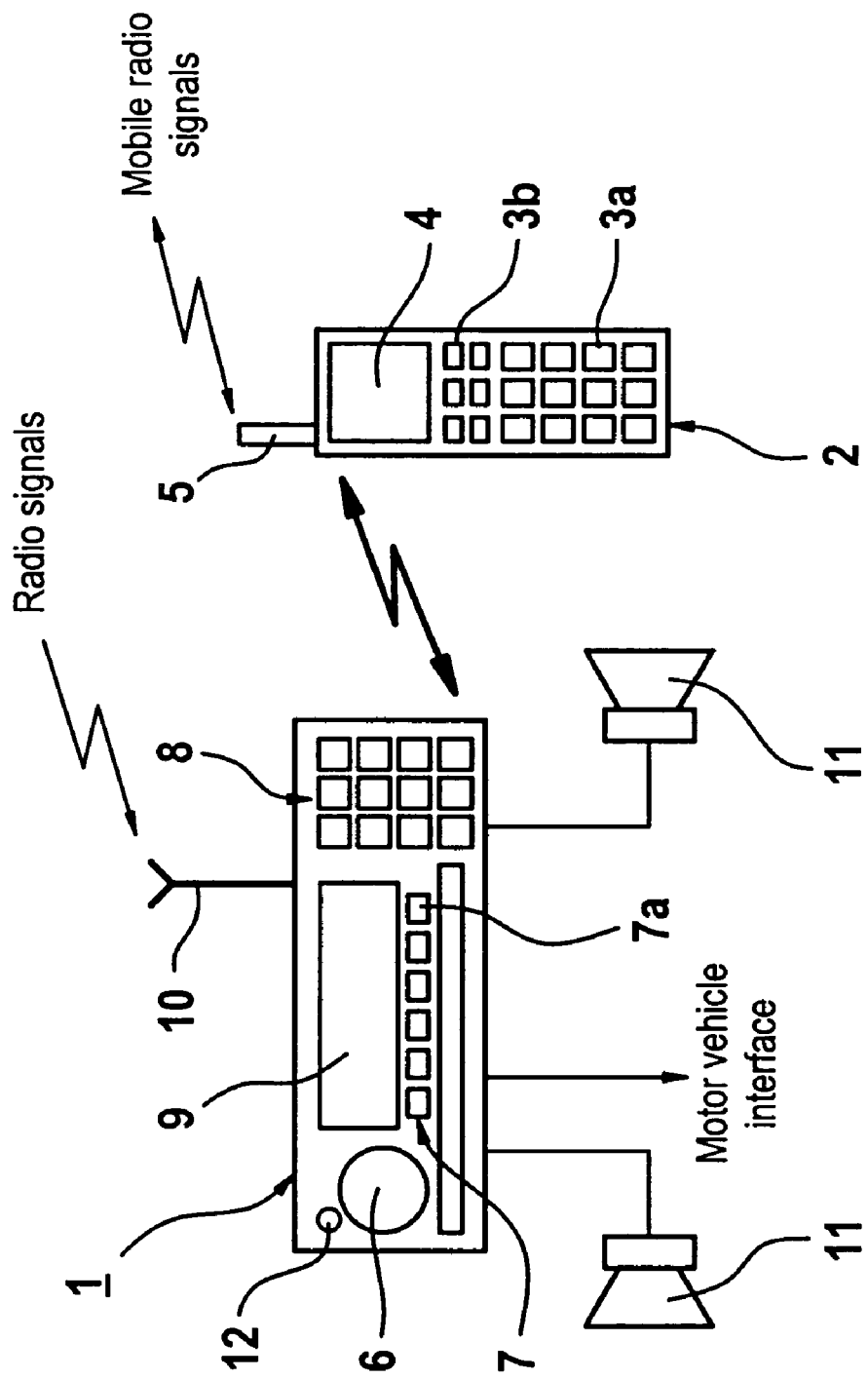
FIG. 1 illustrates an overview of an exemplary communications system according to the present invention.

FIG. 1 shows an overview of an exemplary embodiment of a communications system according to the invention. The communications system contains a radio unit 1 and a mobile phone 2. The mobile phone 2 has, in a manner known per se, a plurality of control elements 3 and a display unit (display) 4. For example, a telephone number is dialed, an incoming telephone call is accepted, a telephone directory is called etc. using the control elements 3. The selected telephone number and further status information items are displayed, for example, on the display 4. Mobile radio signals are received and emitted using the mobile radio antenna 5.

The radio unit 1 has a plurality of groups of control elements 6, 7, 8. The volume of the radio unit, for example, can be set using the control element 6. Further functions, such as the selection of a stored transmitter, can be carried out using the control elements 7. The control elements 8 are embodied as a numerical keypad and thus correspond largely to the control elements 3a of the mobile phone 2. The control elements 8 can thus be used to dial a telephone number. The radio receiver also has a display unit (display) 9. In radio mode, the selected transmitter and other status information, for example, are displayed on the display 9. When a telephone number is dialed using the control elements 8, the telephone number dialed can be displayed on the display 9. When there is an incoming call, the telephone number of the calling party can likewise be displayed on the display 9. Instead of the display of the telephone number, it is also possible to display the name of the calling party on the display 9 if assignments of names and telephone numbers are stored in a storage element of the radio receiver or of the mobile phone.

The radio receiver 1 also has a radio antenna 10 for receiving radio signals. Loudspeakers 11 are connected, as audio output unit, to the radio unit 1. In addition, a microphone 12 is integrated into the radio unit 1. The radio unit 1 is connected to the mobile phone 2 over a short-range radio link, with the result that the radio unit 1 with the microphone 12 and the loudspeakers 11 serves as a hands-free unit for the mobile phone 2. An incoming call can be accepted at the mobile phone 2 by activating the control element 7a on the radio unit 1. Because, in addition, it is also possible to dial a telephone number using the control elements 8 of the radio unit 1, the mobile phone can be placed at any desired location within the vehicle for both incoming and outgoing telephone calls. In particular, it is not necessary to plug the mobile phone 2 into a special mount or to set up a cable connection between the mobile phone 2 and the radio unit 1.

During a telephone call, the audio signals of the voice of the driver or of another vehicle occupant are converted into electrical signals by means of the microphone 12 and transmitted to the mobile phone 2 over the short-range radio link. From the mobile phone 2, the transmission is carried out in a known way over the mobile radio antenna 5 to a stationary mobile radio station of a mobile radio system. The incoming voice signals of the other party are received by the mobile radio antenna 5 and passed on from the mobile phone over the short-range radio link to the radio unit and output there by means of the loudspeakers 11.

Figure 2:
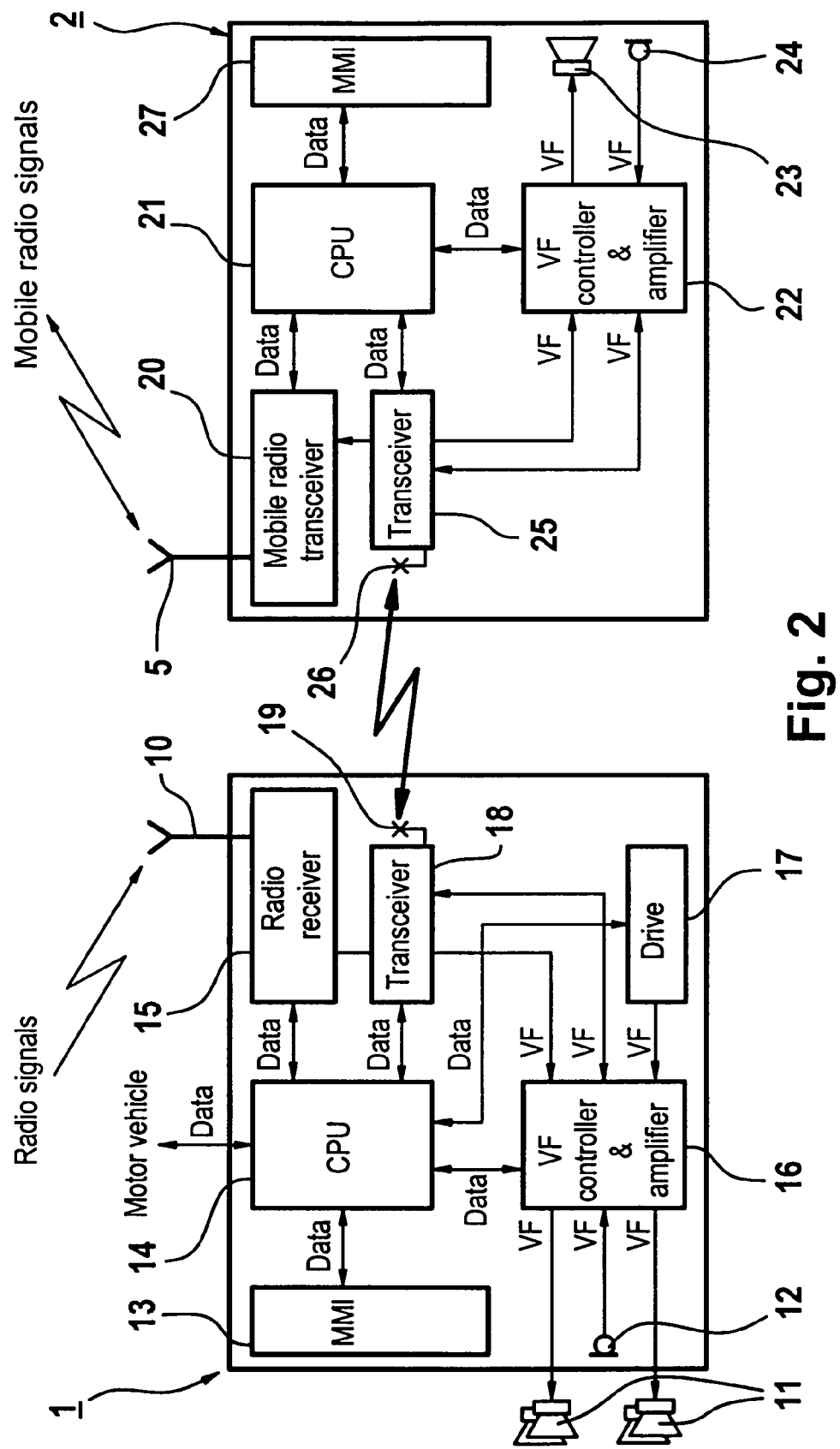
FIG. 2 illustrates a block circuit diagram of an exemplary embodiment of a radio unit and of a mobile phone.

FIG. 2 shows a simplified block circuit diagram of the radio unit 1 and of the mobile phone 2. The radio unit 1 contains a control unit (MMI) 13 which has, for example, the control elements 6, 7 and 8 in FIG. 1. The control unit 13 is connected to a microprocessor unit (CPU) 14. The CPU 14 converts the signals coming from the control unit 13 into control commands. In order to receive broadcast radio channels, the radio unit 1 has a radio antenna 10 which is connected to a radio receiver unit 15. The radio receiver unit 15 is actuated by the CPU 14, for example to select the radio signals of a specific transmitter. In the radio receiver unit 15, the radio signals which are received via the radio antenna 10 are converted into voice frequency (VF) signals in a known fashion.

The voice frequency signals are amplified in a VF controller and amplifier 16 and fed to the loudspeakers 11 for audio playback. In addition, the radio unit 1 contains a drive 17, with the result that, for example, music can be played back from a CD or from a music cassette. The drive 17 is also actuated by the CPU 14. The voice frequency signals which are output by the drive 17 are fed to the VF controller and amplifier 16 and then also output by means of the loudspeakers 11. In this respect the radio unit comprises known embodiments of a conventional car radio.

Furthermore, the radio unit 1 contains a transceiver device 18 with an antenna 19 for setting up a short-range radio link to the mobile phone 2. The transceiver 18 is also actuated by the CPU 14. The transceiver 18 is connected to the VF controller and amplifier 16. In this way, voice signals which are received at the antenna 19 from the mobile phone 2 over the short-range radio link are passed on to the VF controller and amplifier 16 via the transceiver 18 and are output by means of the loudspeakers 11. Voice signals of the driver or of a front seat passenger are picked up by the microphone 12 and fed via the VF controller and amplifier 16 to the transceiver 18 and the antenna 19 and transmitted over the short-range radio link to the mobile phone 2.

The mobile phone 2 has a mobile radio antenna 5 which is connected to a first transceiver unit 20 for mobile radio signals. The transceiver unit 20 is actuated by a CPU 21. The received mobile radio signals are converted in the transceiver unit 20 into VF signals which are fed to a VF controller and amplifier 22. In the conventional mobile radio mode, the VF signals are output by means of a loudspeaker 23 which is integrated into the mobile phone. During conventional operation of the telephone, the voice signals of the telephone user are fed via the microphone 24 of the mobile phone 2 to the VF controller 22 and passed on from there via the transceiver unit 20 and the mobile radio antenna 5 to a stationary mobile radio station and ultimately to the other party. The mobile phone also has, as is known, a control unit 24 for selecting a telephone number and further telephone functions. A mobile phone which is suitable for the communications system according to the invention also has a second transceiver 25 which is connected to an antenna 26. The transceiver 25 is connected to the VF controller and amplifier 22 and is actuated by the CPU 21.

Mobile radio signals which are received via the mobile radio antenna 5 can thus be passed on via the first transceiver unit 20 to the VF controller and amplifier 22 after conversion into VF signals, and transmitted from said VF controller and amplifier 22 to the transceiver 25. From the transceiver 25, the VF signals are transmitted via the antenna 26 over a short-range radio link at a frequency of, for example, 2.4 GHz to the antenna 19 of the radio unit 1 and are output from there by means of the loudspeakers 11 in a fashion which has already been described. Conversely, the voice signals which are transmitted from the antenna 19 of the radio unit over the short-range radio link are picked up by the antenna 26 of the mobile phone 2 and passed onto the VF controller via the transceiver 25. In the transceiver 25, the radio signals are converted into VF signals. From the VF controller 22, the VF signals are then passed on to the first transceiver unit 20. After conversion of the incoming VF signals into mobile radio signals in the transceiver unit 20, they are ultimately transmitted again to the stationary mobile radio station via the mobile radio antenna 5.

In the exemplary embodiment, the transceivers 18 and 25, respectively, preferably operate using the Bluetooth method which is known in the art. As a result, ranges of the short-range radio connection of typically 10 meters, sufficient for application in a motor vehicle, are obtained. The transceivers are implemented here in the form of a microchip.

Both in the radio unit 1 and in the mobile phone 2, the devices are controlled by means of the respective CPU 14 and 21. In this respect, FIG. 3 illustrates a method sequence which describes the function of the radio receiver and of the mobile phone as a communications system with integrated hands-free device. Moreover, the CPU 14 controls the conventional functions of a radio receiver 1. In an analogous way, the CPU 21 also controls the conventional functions of a mobile phone 2.

Figure 3A:
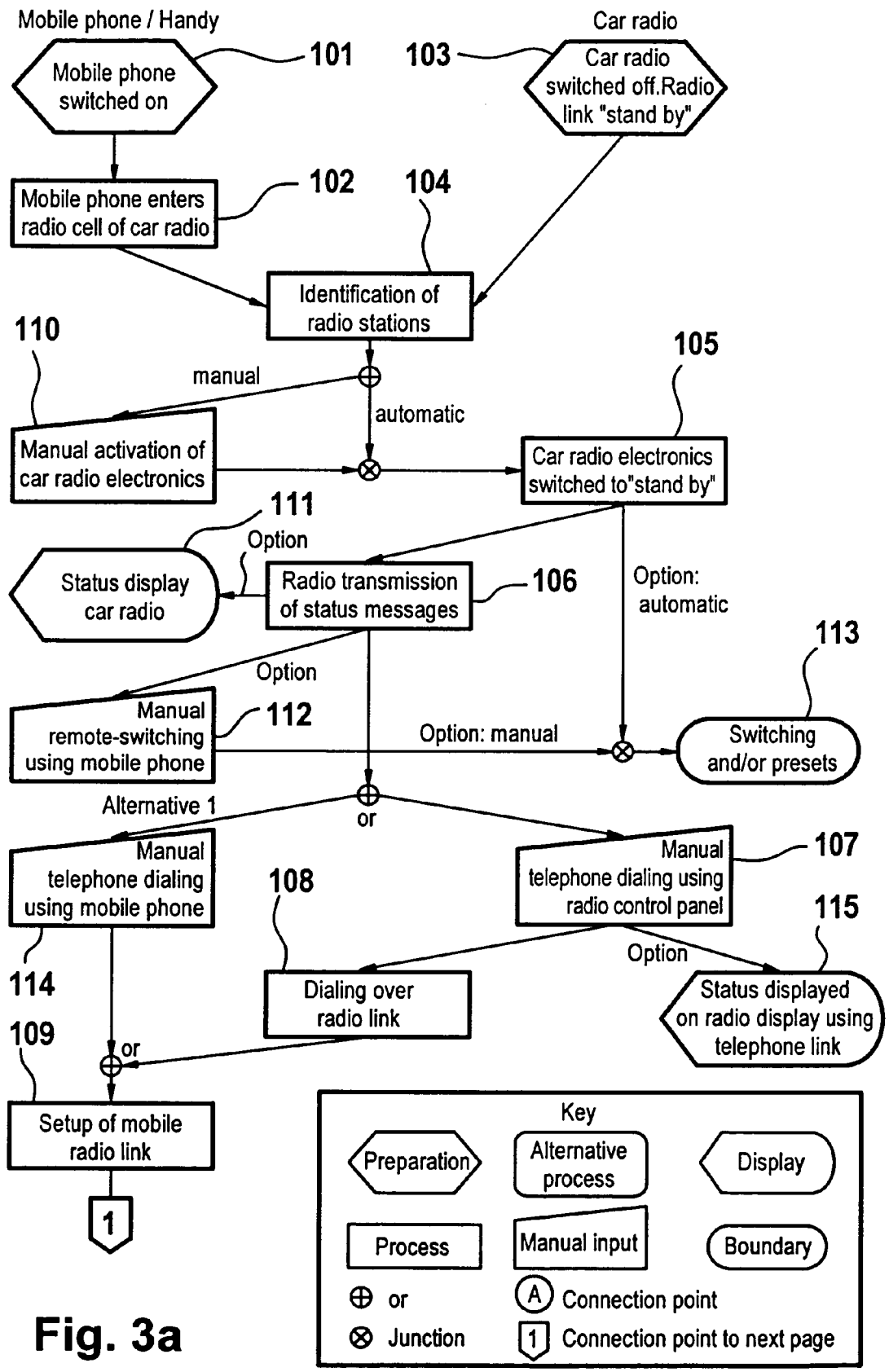
FIG. 3 illustrates a flowchart of a method sequence for an exemplary embodiment.
Figure 3B:
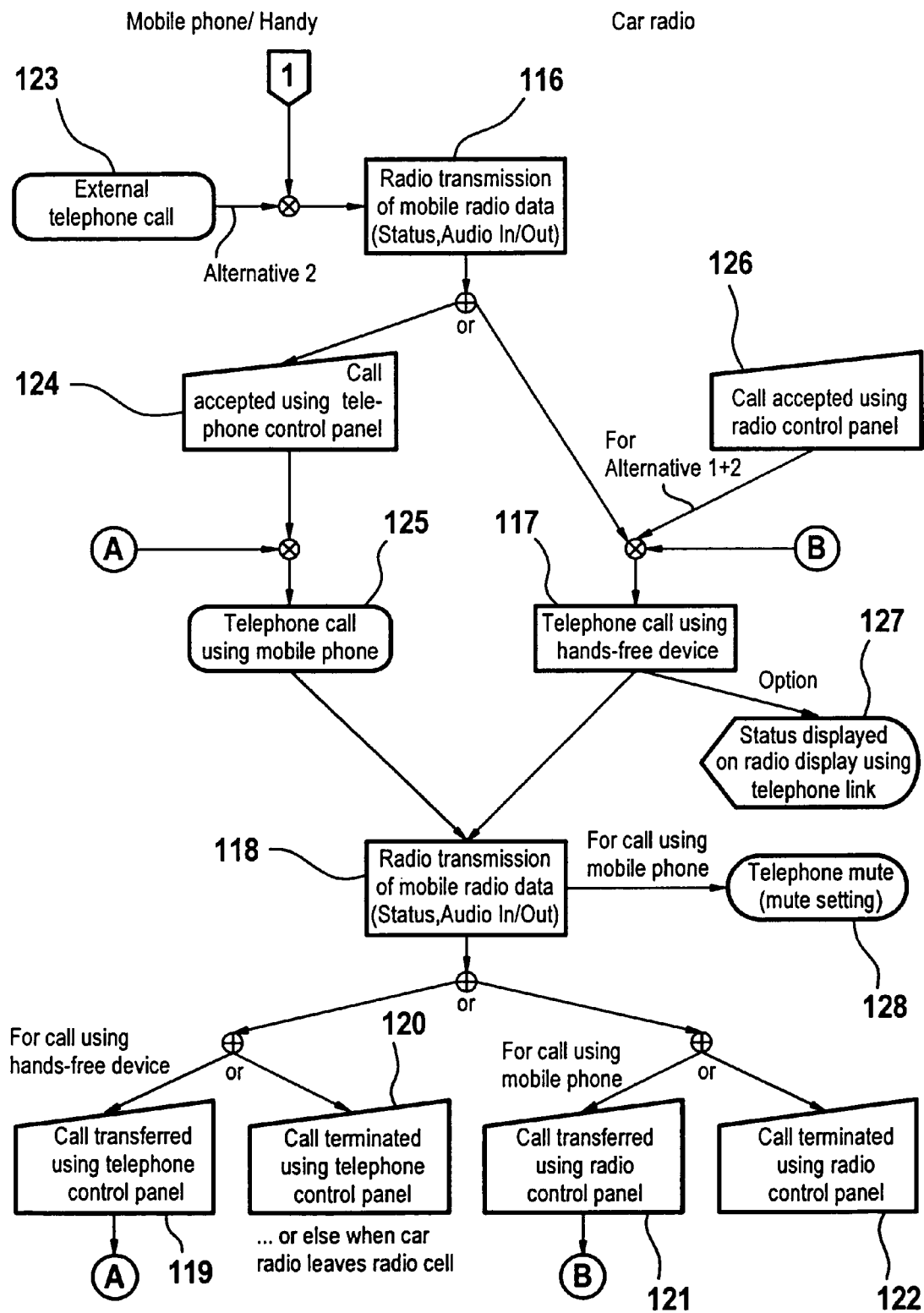

FIGS. 3a and 3b show, by way of example, the method sequence in the communications system for incoming or outgoing telephone calls or data transmission, the connection between FIGS. 3a and 3b being made at the position indicated by "1". In describing the method it is assumed that the mobile phone is switched on (method step 101). The driver, together with the mobile phone, approaches the motor vehicle or enters the motor vehicle and thus enters the radio cell of the radio unit which is installed in the vehicle as a car radio (step 102). The radio cell being conditioned by the range of the radio link. At this time, the car radio is normally switched off but the short-range radio link is in the standby mode (step 103). After the driver, together with the mobile phone, enters the radio cell of the car radio, mutual identification of the radio stations in the mobile phone and in the car radio takes place in step 104.

After successful identification, the car radio electronics can automatically be switched to the standby mode (step 105). However, as an alternative, manual activation of the car radio electronics is also provided in step 110. Then, in step 106, status messages are transmitted between the mobile phone and the car radio. If the driver then wishes to make a telephone call, he can dial the desired telephone number using the control elements of the radio unit (step 107). Then, in step 108, the telephone number is dialed over the short-range radio link to the mobile phone. As an alternative, in step 114, the telephone number can also be dialed directly at the mobile phone.

Then the mobile radio link is set up in step 109. The radio transmission of the mobile radio data subsequently takes place in step 116. The telephone call can be made here using the hands-free device which is integrated in the radio unit (step 117). However, the telephone call can also alternatively be made using the mobile phone (step 125). By appropriately activating keys on the radio unit or on the mobile phone it is possible here to switch between making a call using the hands-free device or making one using the mobile phone. The radio transmission of the mobile radio data to the stationary mobile radio station also continues (step 118) after such a switchover. In the case of a telephone call which is initially being made using the hands-free device, said call can be transferred using the mobile phone by activating a respective control element of the mobile phone in step 119.

If the call is made using the mobile phone, it can be transferred to the hands-free device by activating a respective control element on the radio unit in step 121. The telephone call can be terminated either using a control element of the mobile phone (step 120) or using a control element of the radio unit (step 122).

If an external telephone call is received at the mobile phone 2 (step 123), there is initially a status transmission to the radio unit so that audio and/or visual signaling takes place. The driver can then accept the incoming telephone call using a control element of the radio unit (step 126). The telephone call is made here using the hands-free device (step 117), and the mobile radio data are transmitted (step 118). Alternatively, in step 124, the call can also be accepted using a control element of the mobile phone, and the telephone call can be made using the mobile phone (step 125). The call is terminated or transferred to the mobile phone or to the hands-free device in the fashion previously described in method steps 119 to 122.

Exemplary steps of the method according to the invention are thus the mutual identification of the radio stations when the mobile phone enters the radio coverage area of the radio unit and the switching on of the standby mode of the hands-free device. The transmission of status messages over the short-range radio link and the activation of the hands-free device for the transmission of incoming or outgoing mobile radio data or calls between the mobile phone and the radio unit are additional exemplary method steps. Furthermore, it is preferred that telephone calls can be accepted or made either at the mobile phone or at the hands-free device in the radio unit.

Additionally, there are also a multiplicity of modifications and options of the method. For example, in step 103, the radio link does not have to be continuously switched to the standby mode. Instead, the standby mode can be switched on, for example, when the vehicle doors are opened by means of the central locking system or the ignition of the motor vehicle is switched on.

In one particular preferred embodiment of the invention it is possible for specific setting operations to be performed on the vehicle or on devices in the vehicle after the car radio electronics have been switched to the standby mode in step 105. Examples of such automatic, predefined switching procedures are, the switching on or off of the hands-free function, the selection of a specific station key on the radio unit, and thus of a specific radio transmitter, specific audio settings or the deactivation of an antitheft system of the car radio. Such operations relating to the vehicle itself may comprise activation of the central locking system with automatic unlocking of the vehicle doors, a specific seat setting or the deactivation of the vehicle antitheft system. These functions may be performed automatically or else switched remotely by manual means using the mobile phone (step 112).

In further specific alternate embodiments, status displays of the radio unit or of the telephone link may be displayed on the display of the radio unit (step 111 or 115, 127). There is also provision for the hands-free device to be switched to a mute setting if the telephone call is made using the mobile phone (step 128).

It will be appreciated by those skilled in the art that the radio links described herein may be embodied in other alternate electromagnetic transmission links, such as, for example, via a wireless infrared transmission communication link. This embodiment would be particularly advantageous to eliminate undesired cross-talk between adjacent vehicles using similar systems. In such an embodiment, the user need only place the infrared transceiver unit of the phone near or simply facing a corresponding unit located in the motor vehicle.

The communications system according to the invention, the radio unit according to the invention and the method according to the invention have been explained by reference to an exemplary embodiment having a plurality of variants. At the same time, a multiplicity of further refinements is possible without departing from the basic concept of the invention as detailed in the claims below.

What is claimed is:

1. A communications system of a motor vehicle, comprising:
   a mobile phone removable from the motor vehicle and capable of operation when removed from the motor vehicle, having control elements, a display and a first transceiver for communicating on a first radio link between the mobile phone and an external stationary transceiver,
   a second transceiver integrated into the mobile phone communicating over a short-range wireless electromagnetic link with a further transceiver located within the motor vehicle;
   a speaker and microphone coupled to the further transceiver allowing for hands free transmission of audio signals to and from the mobile telephone; and
   an audio system coupled to the further transceiver which has a third receiver unit which receives radio signals in the FM and AM frequency bands, the audio system being configured to play back radio broadcasts received by the third receiver, and wherein transmission between the mobile phone and the further transceiver takes place on an electromagnetic frequency outside the frequency bands of the radio signals;
   wherein the mobile phone is operable by control elements in the audio system.

2. The communications system as claimed in claim 1, wherein the transmission over the short-range wireless electromagnetic link takes place on a frequency that is different from the frequency of the first radio link.

3. The communications system as claimed in claim 1, wherein the transmission over the short-range wireless electromagnetic link is at a frequency of more than 2 GHz.

4. The communications system as claimed in claim 1, wherein the range for the short-range wireless electromagnetic link is not more than 100 m.

5. The communications system as claimed in claim 1, wherein the motor vehicle further comprises a navigation system.

6. The communications system as claimed in claim 1, wherein the microphone is permanently installed in the vehicle.

7. The communications system as claimed in claim 1, wherein the microphone is a directional microphone.

8. The communications system as claimed in claim 1, wherein the microphone is connected to the further transceiver via a further wireless link.

9. The communications system as claimed in claim 1, wherein the transmission over the short-range wireless electromagnetic link is performed in accordance with Bluetooth®.

10. The communications system as claimed in claim 1, further comprising a navigation system having at least one control element for accepting data which is received at the mobile phone.

11. The communications system as claimed in claim 1, further comprising:
    at least one of an audio and an information system which is operated by the control elements of the mobile phone.

12. The communications system as claimed in claim 1, wherein the mobile phone is linked with a voice recognition system.

13. The communications system as claimed in claim 1, wherein a voice recognition system is integrated into the mobile phone.

14. The communications system as claimed in claim 1, wherein the audio system is connected to a navigation system.

15. The communications system as claimed in claim 1, wherein the mobile phone receives driving or route information and the information is routed to a navigation system via the short-range wireless electromagnetic link.

16. The communications system as claimed in claim 1, wherein the mobile phone can control vehicle functions by transmitting commands over the short range wireless electromagnetic link.

17. The communications system as claimed in claim 1, wherein the mobile phone is in communication with a position-determining means that filters relevant traffic information.

18. The communications system as claimed in claim 1, wherein the range for the bi-directional short range radio link is approximately 10 m.

19. A radio unit for a motor vehicle, comprising:
an input unit;
an audio output unit;
a receiver coupled to the audio output unit for receiving radio signals within specific frequency bands and means for converting the received radio signals into audio signals output through the audio output unit, the radio unit being constructed as an independent device; and
a further receiver unit coupled to a transmitter unit, the further receiver unit and the transmitter unit being additionally integrated into the radio unit and being configured to wirelessly connect an independent external device over a bi-directional short range wireless radio link;
wherein voice signals which are received by the further receiver unit are output through the audio output unit;
wherein transmissions over the bi-directional short range wireless radio link utilizes signals that are different from the specific frequency bands; and
wherein if the external device is a mobile phone and the radio unit is utilizable as a hands-free device, and if the mobile phone and the hands-free device are configurable to mutually identify the radio unit and the mobile phone, then, when said mobile phone enters a radio coverage area of the radio unit, the hands-free device is switched to standby mode, status messages are transmitted over the bi-directional short range radio link and the hands-free device is activated for transmission of incoming or outgoing mobile radio data or voice calls between the mobile phone and the radio unit.

20. The radio unit as claimed in claim 19, wherein the transmission over the bi-directional short range radio link occurs at frequencies of more than 2 GHz.

21. The radio unit as claimed in claim 19, wherein the range for the bi-directional short range radio link is not more than 100 m.

22. The radio unit as claimed in claim 19, wherein the transmitter device of the radio receiver is connected to a microphone.

23. The radio unit as claimed in claim 19, wherein the microphone is an integral portion of the radio unit.

24. The radio unit as claimed in claim 19, wherein the microphone is a directional microphone.

25. The radio unit as claimed in claim 19, wherein transmission from the microphone signal employs a further wireless link.

26. The radio unit as claimed in claim 19, further comprising at least one control element for accepting instructions received at the mobile phone.

27. The radio unit as claimed in claim 26, wherein the at least one control element sends at least one signal to either a personal computer, a headset, an external display, or a door opener.

28. The radio unit as claimed in claim 19, wherein transmission over the bi-directional short range radio link is performed in accordance with Bluetooth®.

29. The radio unit as claimed in claim 19, further comprising a plurality of control elements for operating a plurality of external devices.

30. The radio unit as claimed in claim 19, further comprising a voice recognition system for processing voice commands.

31. The radio unit as claimed in claim 30, wherein the voice recognition system is integrated into at least one external device.

32. The radio unit as claimed in claim 19, further comprising a navigation system.

33. The radio unit as claimed in claim 32 further comprising a means for transmitting to the navigation system traffic, driving or route information.

34. The radio unit as claimed in claim 19, wherein the range for the bi-directional short range radio link is approximately 10 m.

35. A radio unit for a motor vehicle, comprising:
an input unit;
an audio output unit;
a receiver coupled to the audio output unit for receiving radio signals within specific frequency bands and means for converting the received radio signals into audio signals output through the audio output unit, the radio unit being constructed as an independent device; and
a further receiver unit coupled a transmitter unit, the further receiver unit and the transmitter unit being additionally integrated into the radio unit and being configured to wirelessly connect an independent external device over a bi-directional short range wireless radio link;
wherein voice signals which are received by the further receiver unit are output through the audio output unit;
wherein transmissions over the bi-directional short range wireless radio link utilizes signals that are different from the specific frequency bands;
wherein if the external device is a mobile phone and the radio unit is utilizable as a hands-free device, and if the mobile phone and the hands-free device are configurable to mutually identify the radio unit and the mobile phone, then, when said mobile phone enters a radio coverage area of the radio unit, the hands-free device is switched to standby mode, status messages are transmitted over the bi-directional short range radio link and the hands-free device is activated for transmission of incoming or outgoing mobile radio data or voice calls between the mobile phone and the radio unit; and
wherein a voice call transfer between the mobile phone and hands-free device is possible.

36. A radio unit for a motor vehicle, comprising:
an input unit;
an audio output unit;
a receiver coupled to the audio output unit for receiving radio signals within specific frequency bands and means for converting the received radio signals into audio signals output through the audio output unit, the radio unit being constructed as an independent device; and
a further receiver unit coupled a transmitter unit, the further receiver unit and the transmitter unit being additionally integrated into the radio unit and being configured to wirelessly connect an independent external device over a bi-directional short range wireless radio link;
wherein voice signals which are received by the further receiver unit are output through the audio output unit;
wherein transmissions over the bi-directional short range wireless radio link utilizes signals that are different from the specific frequency bands; and
wherein if the external device is a mobile phone and the radio unit is utilizable as a hands-free device, and if the mobile phone and the hands-free device are configurable to mutually identify the radio unit and the mobile phone, then, when said mobile phone enters a radio coverage area of the radio unit, the hands-free device is switched to standby mode, status messages are transmitted over the bi-directional short range radio link and the hands-free device is activated for transmission of incoming or outgoing mobile radio data or voice calls between the mobile phone and the radio unit; and wherein a telephone number of a calling party is communicated to the audio output unit or an information system and can be output on a display unit.

* * * * *